US009452741B2

(12) United States Patent
Kidera et al.

(10) Patent No.: US 9,452,741 B2
(45) Date of Patent: Sep. 27, 2016

(54) VEHICLE BRAKE SYSTEM

(71) Applicant: HONDA MOTOR CO., LTD., Tokyo (JP)

(72) Inventors: Kazuharu Kidera, Wako (JP); Takashi Shimada, Wako (JP); Soichiro Ueura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/323,127

(22) Filed: Jul. 3, 2014

(65) Prior Publication Data

US 2015/0008727 A1  Jan. 8, 2015

(30) Foreign Application Priority Data

Jul. 4, 2013 (JP) ................. 2013-140283

(51) Int. Cl.
| | |
|---|---|
| B60T 8/42 | (2006.01) |
| B60T 7/12 | (2006.01) |
| B60T 13/14 | (2006.01) |
| B60T 13/68 | (2006.01) |
| B60T 8/1755 | (2006.01) |
| B60T 7/04 | (2006.01) |
| B60T 13/66 | (2006.01) |
| B60T 13/74 | (2006.01) |
| B60T 8/88 | (2006.01) |

(Continued)

(52) U.S. Cl.
CPC ................. *B60T 7/12* (2013.01); *B60T 7/042* (2013.01); *B60T 8/1755* (2013.01); *B60T 8/4081* (2013.01); *B60T 8/885* (2013.01); *B60T 13/145* (2013.01); *B60T 13/146* (2013.01); *B60T 13/662* (2013.01); *B60T 13/686* (2013.01); *B60T 13/745* (2013.01); *B60T 8/4291* (2013.01); *B60T 8/4872* (2013.01)

(58) Field of Classification Search
CPC .. B60T 8/4081; B60T 8/4266; B60T 8/4291; B60T 8/4872; B60T 13/145
USPC ........ 303/15, 16, 113.2, 114.1, 115.2, 116.1, 303/116.2
See application file for complete search history.

(56) References Cited

U.S. PATENT DOCUMENTS

| | | | | |
|---|---|---|---|---|
| 7,651,176 B2* | 1/2010 | Inoue | ............... | B60T 8/4081 |
| | | | | 303/114.1 |
| 7,823,985 B2* | 11/2010 | Hatano | ............... | B60Q 1/44 |
| | | | | 303/114.1 |

(Continued)

FOREIGN PATENT DOCUMENTS

| | | |
|---|---|---|
| CN | 102556031 A | 7/2012 |
| JP | 2009-227023 A | 10/2009 |

OTHER PUBLICATIONS

Office Action dated Apr. 6, 2016, issued in counterpart Chinese Patent Application No. 201410299460.9, with English translation. (9 pages).

*Primary Examiner* — Thomas Irvin

(74) *Attorney, Agent, or Firm* — Westerman, Hattori, Daniels & Adrian, LLP

(57) ABSTRACT

A vehicle brake system includes a slave cylinder configured to drive an electric motor and generate a brake fluid pressure by moving pistons with a ball screw shaft; normally open type master cut valves that communicate/shut off between the slave cylinder and a master cylinder; and a control unit that controls the electric motor to close the master cut valves and limit a displacement of the ball screw shaft on the basis of a reference position during operation of a VSA device.

5 Claims, 5 Drawing Sheets

(51) Int. Cl.
*B60T 8/40* (2006.01)
*B60T 8/48* (2006.01)

(56) References Cited

U.S. PATENT DOCUMENTS

| | | | | |
|---|---|---|---|---|
| 7,988,241 B2* | 8/2011 | Ishii | ............... | B60T 7/042 303/11 |
| 8,226,176 B2* | 7/2012 | Hatano | ............... | B60T 8/4081 303/115.2 |
| 8,231,181 B2* | 7/2012 | Hatano | ............... | B60T 7/042 188/345 |
| 8,328,297 B2* | 12/2012 | Hatano | ............... | B60T 8/4081 303/113.4 |
| 8,333,442 B2* | 12/2012 | Hatano | ............... | B60T 8/4081 303/11 |
| 8,550,573 B2* | 10/2013 | Hatano | ............... | B60T 8/4081 303/10 |
| 8,579,386 B2* | 11/2013 | Hatano | ............... | B60T 8/4081 303/113.5 |
| 8,801,110 B2* | 8/2014 | Hatano | ............... | B60L 7/24 303/11 |
| 8,827,378 B2* | 9/2014 | Toyohira | ............... | B60T 7/06 303/113.4 |
| 8,840,199 B2* | 9/2014 | Hatano | ............... | B60T 8/4081 303/113.1 |
| 8,851,579 B2* | 10/2014 | Ohkubo | ............... | B60T 7/042 303/113.2 |
| 8,899,695 B2* | 12/2014 | Tanaka | ............... | B60T 13/745 303/14 |
| 8,911,029 B2* | 12/2014 | Ohnishi | ............... | B60T 13/745 188/162 |
| 8,911,030 B2* | 12/2014 | Ohnishi | ............... | B60T 7/042 303/114.1 |
| 8,926,027 B2* | 1/2015 | Shimada | ............... | B60T 7/042 303/10 |
| 8,991,941 B2* | 3/2015 | Gotoh | ............... | B60T 8/4081 303/116.1 |
| 2008/0079309 A1* | 4/2008 | Hatano | ............... | B60T 8/4081 303/113.5 |
| 2012/0112525 A1* | 5/2012 | Shimada | ............... | B60T 7/042 303/10 |
| 2012/0119566 A1* | 5/2012 | Ohnishi | ............... | B60T 7/042 303/20 |
| 2012/0161506 A1* | 6/2012 | Tanaka | ............... | B60T 13/745 303/14 |
| 2012/0193975 A1* | 8/2012 | Ishii | ............... | B60T 8/4081 303/14 |
| 2012/0283926 A1* | 11/2012 | Ito | ............... | B60T 8/4018 701/70 |
| 2012/0306260 A1* | 12/2012 | Ohkubo | ............... | B60T 7/042 303/14 |
| 2012/0313427 A1* | 12/2012 | Nishioka | ............... | B60T 7/042 303/10 |
| 2012/0326491 A1* | 12/2012 | Gotoh | ............... | B60T 8/4081 303/6.01 |
| 2013/0186083 A1* | 7/2013 | Hatano | ............... | B60T 8/4081 60/571 |
| 2013/0220744 A1* | 8/2013 | Ohnishi | ............... | B60T 7/042 188/152 |
| 2013/0232965 A1* | 9/2013 | Ohnishi | ............... | B60T 8/3685 60/545 |
| 2013/0232966 A1* | 9/2013 | Murayama | ............... | B60T 7/042 60/545 |
| 2013/0232968 A1* | 9/2013 | Ohnishi | ............... | B60T 8/3685 60/545 |
| 2013/0239567 A1* | 9/2013 | Ohnishi | ............... | B60T 7/042 60/545 |
| 2014/0008965 A1* | 1/2014 | Ito | ............... | B60T 8/4081 303/3 |
| 2014/0008966 A1* | 1/2014 | Hotani | ............... | B60T 8/4081 303/14 |
| 2014/0020377 A1* | 1/2014 | Ito | ............... | F15B 15/00 60/534 |
| 2014/0026557 A1* | 1/2014 | Ohnishi | ............... | B60T 8/4081 60/545 |
| 2014/0183936 A1* | 7/2014 | Kinoshita | ............... | B60T 7/122 303/20 |
| 2014/0319903 A1* | 10/2014 | Murayama | ............... | B60T 8/368 303/15 |
| 2014/0350816 A1* | 11/2014 | Tahara | ............... | B60T 7/042 701/70 |
| 2014/0372004 A1* | 12/2014 | Kinoshita | ............... | B60T 8/4081 701/70 |
| 2014/0373526 A1* | 12/2014 | Ohnishi | ............... | B60T 13/745 60/545 |
| 2014/0379234 A1* | 12/2014 | Kato | ............... | B60L 7/18 701/70 |
| 2015/0021981 A1* | 1/2015 | Shimada | ............... | B60T 13/146 303/121 |
| 2015/0061363 A1* | 3/2015 | Murayama | ............... | B60T 8/17 303/14 |
| 2015/0061364 A1* | 3/2015 | Murayama | ............... | B60T 8/17 303/15 |
| 2015/0061366 A1* | 3/2015 | Shimada | ............... | B60T 13/146 303/15 |
| 2015/0084401 A1* | 3/2015 | Shimada | ............... | B60T 8/36 303/15 |
| 2015/0097415 A1* | 4/2015 | Shimada | ............... | B60T 7/042 303/3 |
| 2015/0097416 A1* | 4/2015 | Ueura | ............... | B60T 7/042 303/3 |
| 2015/0115699 A1* | 4/2015 | Shimada | ............... | B60T 7/042 303/3 |
| 2015/0183411 A1* | 7/2015 | Sakurazawa | ............... | B60T 8/4081 701/70 |
| 2015/0183414 A1* | 7/2015 | Kobayashi | ............... | B60T 13/662 303/3 |

* cited by examiner

VEHICLE BRAKE SYSTEM

CROSS REFERENCES TO RELATED APPLICATIONS

The present application claims priority under 35 U.S.C. §119 to Japanese Patent Application No. 2013-140283, filed Jul. 4, 2013, entitled "Vehicle Brake System." The contents of this application are incorporated herein by reference in their entirety.

TECHNICAL FIELD

The present disclosure relates to vehicle brake systems that generate a braking force of vehicle.

BACKGROUND

In a known vehicle braking technology, a stepping force of a brake pedal by a driver is detected and converted into an electric signal, and a brake fluid pressure is generated by a slave cylinder in response to the electric signal.

For example, Japanese Unexamined Patent Application Publication No. 2009-227023 discloses a brake device which includes a master cylinder connected to a brake pedal, a slave cylinder which operates depending on a stepping force of the brake pedal, and a Vehicle Stability Assist (VSA) (registered trademark) device connected to the slave cylinder. Further, a shutoff valve (master cut valve) is provided in a piping tube that connects the master cylinder and the brake cylinder.

In the disclosure of Japanese Unexamined Patent Application Publication No. 2009-227023, for example, when the vehicle is in an unstable state, the control unit stabilizes the behavior of vehicle by actuating the slave cylinder and the VSA device. During actuation of the VSA device or an automatic system such as a follow-up control, a low speed follow-up control and a collision mitigation brake that automatically actuates the slave cylinder, the control unit keeps the shutoff valve in a closed state. Moreover, when an abnormality such as a failure of an electric motor of the slave cylinder occurs during actuation of the VSA device or the automatic system, the control unit opens the shutoff valve so that stepping of the brake pedal is directly reflected to braking of the vehicle.

When the shutoff valve is opened, a pressure chamber of the slave cylinder communicates with a reservoir (having a pressure substantially equal to the atmospheric pressure). As a result, a pressure in an area upstream of a piston of the slave cylinder decreases to the atmospheric pressure, and the piston may not be fully returned (may not be fully retracted).

Accordingly, in the disclosure of Japanese Unexamined Patent Application Publication No. 2009-227023, during an initial stepping of the brake pedal after the shutoff valve is opened, the brake fluid pressure generated in the master cylinder is used to return the piston of the slave cylinder which is not fully retracted. That is, during the initial stepping, a certain amount of the stepping of the brake pedal by the driver is used to return the piston of the slave cylinder, which results in a fluid loss (ineffective stroke). When the fluid loss is large, the driver may feel a free running feeling.

SUMMARY

The present application describes a vehicle brake system capable of ensuring stable operability even if an abnormality occurs.

A vehicle brake system according to the present disclosure includes a slave cylinder configured to drive an electric actuator having a shaft member which can be retracted to a predetermined position in a cylinder body and generate a brake fluid pressure by moving a piston by the shaft member; a normally open type master cut valve that communicates and shuts off between the slave cylinder and a master cylinder to which a brake operation of a driver is input; and a control unit that controls the electric actuator and the master cut valve, with the vehicle being provided with an automatic brake device which has an upstream side connected to the master cut valve and is configured to generate a brake fluid pressure regardless of the brake operation by the driver, wherein the control unit closes the master cut valve and controls the electric actuator to limit a displacement of the shaft member taking the predetermined position as a reference during operation of the automatic brake device.

With this configuration, the control unit limits the displacement of the shaft member in the cylinder body of the slave cylinder during operation of the automatic brake device. Accordingly, at the time when an abnormality such as a failure of the electric actuator occurs and the master cut valve is opened, the shaft member is located in the proximity of the predetermined position where it can be retracted. The "predetermined position" herein is a position of the shaft member with its rear end restricted in the cylinder body of the slave cylinder.

Accordingly, in this disclosure, a fluid loss which is necessary to retract the shaft member of the electric actuator to the predetermined position can be reduced. As a result, the driver can perform a stable brake operation in the initial stepping after the master cut valve is opened without feeling the free running.

Further, it is preferable that a maximum distance of the displacement limited by the control unit is determined in advance to be in a range in which a predetermined braking force can be generated in response to a brake operation by the driver in a state that the control unit stops the electric actuator and opens the master cut valves in occurrence of abnormality.

With this configuration, when an abnormality occurs during operation of the automatic brake device, a predetermined braking force can be generated in the initial stepping by the driver after the control unit stops the electric actuator and opens master cut valve. Accordingly, in this disclosure, a stable operability can be ensured even if an abnormality occurs.

Further, it is preferable that the vehicle brake system further includes a displacement detection unit that directly or indirectly detects the displacement of the shaft member, wherein the control unit closes the master cut valve, calculates the displacement of the shaft member based on a signal from the displacement detection unit and controls the electric actuator to limit the displacement not to exceed the maximum distance.

With this configuration, the control unit controls the electric actuator to limit the displacement of the shaft member not to exceed the maximum distance which is capable of generating a predetermined braking force based on the signal from the displacement detection unit. Accordingly, the displacement of the shaft member can be appropriately limited while the master cut valve is closed and the automatic brake device is operated.

The present disclosure provides a vehicle brake system capable of ensuring stable operability even if an abnormality occurs.

BRIEF DESCRIPTION OF THE DRAWINGS

The advantages of the disclosure will become apparent in the following description taken in conjunction with the following drawings.

DETAILED DESCRIPTION

An exemplary implementation of the present disclosure (hereinafter, referred to as an embodiment) will be described below in detail with reference to the accompanying drawings as appropriate.

Embodiment

[Configuration of Vehicle Brake System]

Figure 1:
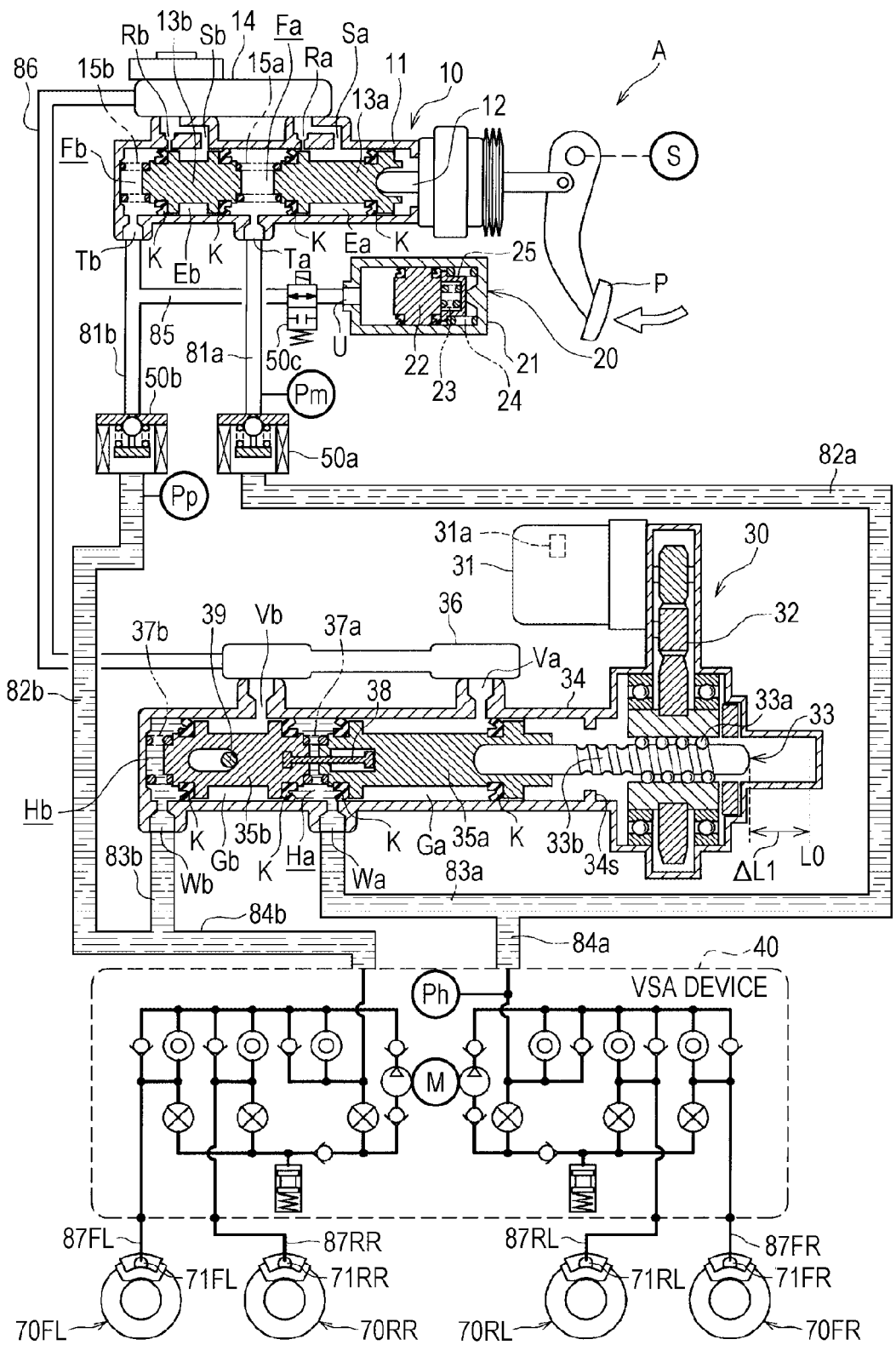
FIG. 1 is a hydraulic circuit diagram of a vehicle brake system in a normal mode according to one embodiment of the present disclosure.

A vehicle brake system A of FIG. 1 is a system that actuates wheel cylinders 71FR, 71RL, 71RR, 71FL of wheels by generating a brake fluid pressure and applies brake to a vehicle. The vehicle brake system "A" mainly includes a master cylinder 10, a stroke simulator 20, a slave cylinder 30, a VSA device 40, master cut valves 50a, 50b and a control unit 60 (see FIG. 2).

[Master Cylinder]

The master cylinder 10 generates a brake fluid pressure corresponding to a stepping force of a brake pedal P at least in piping tubes 81a, 81b. The master cylinder 10 is a tandem type cylinder, for example, as shown in FIG. 1, and mainly includes a cylinder body 11, a push rod 12, pistons 13a, 13b and spring members 15a, 15b.

The cylinder body 11 is formed in a bottomed cylindrical shape having an opening in which the push rod 12 is inserted, and the push rod 12, the piston 13a, the spring member 15a, the piston 13b and the spring member 15b are substantially coaxially arranged in the cylinder body 11, in sequence from the right of the drawing.

The push rod 12 is connected to the brake pedal P at one end and to the piston 13a at the other end, and transmits a stepping force of a driver which is exerted on the brake pedal P to the piston 13a. The brake pedal P is provided with a stroke sensor S for detecting displacement of the brake pedal P (that is, the stepping force by a driver).

The pistons 13a, 13b have a cylindrical shape and are housed in the cylinder body 11 so as to be slidably movable in the axial direction. A radially recessed portion is formed on the peripheral surface of the piston 13a such that an annular back chamber Ea is formed between the peripheral surface and the inner peripheral surface of the cylinder body 11. The back chamber Ea communicates with a reservoir 14 via a supply port Sa. Further, a back chamber Eb is formed between the peripheral surface of the piston 13b and the inner peripheral surface of the cylinder body 11 and communicates with the reservoir 14 via a supply port Sb.

A first pressure chamber Fa that communicates with an output port Ta is formed between the pistons 13a and 13b. A second pressure chamber Fb that communicates with an output port Tb is formed between the piston 13b and the inner wall surface of the cylinder body 11. The first pressure chamber Fa is configured to communicate with the supply port Sa and the reservoir 14 via a relief port Ra when the piston 13a is retracted to the right in the drawing. Further, a second pressure chamber Fb is configured to communicate with the supply port Sb and the reservoir 14 via a relief port Rb when the piston 13b is retracted to the right in the drawing.

A piston packing K is disposed on the peripheral surface of the pistons 13a, 13b and separates the back chamber Ea, the first pressure chamber Fa, the back chamber Eb and the second pressure chamber Fb. The reservoir 14 stores a brake fluid and communicates with the supply ports Sa, Sb and the relief ports Ra, Rb. The internal pressure of the reservoir 14 is substantially equal to the atmospheric pressure.

The spring member 15a is a compression coil spring interposed between the piston 13a and the piston 13b so as to expand and contract depending on the force applied by the pistons 13a, 13b. The spring member 15b is a compression coil spring interposed between the piston 13b and the inner wall surface of the cylinder body 11 so as to expand and contract depending on the force applied by the piston 13b.

[Stroke Simulator]

The stroke simulator 20 generates an operational reaction force depending on the stepping force of the brake pedal P and includes a cylinder body 21, a piston 22, a spring members 23, 24 and a spring seat member 25.

The cylinder body 21 is formed in a bottomed cylindrical shape, and the piston 22, the spring member 23, the spring seat member 25 and the spring member 24 are substantially coaxially arranged in the cylinder body 21, in sequence from the left of the drawing. The piston 22 have a cylindrical shape and is slidably movable in the axial direction in the cylinder body 21 depending on the brake fluid pressure which is applied via an input port U.

The spring member 23 is a compression coil spring interposed between the piston 22 and the spring seat member 25. The spring member 24 is a compression coil spring interposed between the spring seat member 25 and the inner wall surface of the cylinder body 21. The spring member 24 has a spring constant which is larger than a spring constant of the spring member 23. Accordingly, when the driver gradually increases the stepping force of the brake pedal P, the spring member 23 having a smaller spring constant is first compressed and deformed and then the spring member 24 having a larger spring constant is compressed and deformed. With this configuration, the driver feels as if his/her own stepping force generates the braking force.

The spring seat member 25 is a plate member for receiving a biasing force from the spring members 23, 24 and is interposed between the spring members 23, 24 in the axial direction.

[Slave Cylinder]

The slave cylinder 30 generates a brake fluid pressure by moving pistons 35a, 35b by an electric actuator (such as an electric motor 31). The slave cylinder 30 mainly includes the electric motor 31, a gear mechanism 32, a ball screw structure 33, a cylinder body 34, the pistons 35a, 35b and spring members 37a, 37b.

The electric motor 31 operates in response to a command signal received from the control unit 60. A hall sensor 31a (displacement detection unit) that detects a mechanical angle of a rotor (not shown in the figure) is incorporated in the electric motor 31. The gear mechanism 32 transmits a rotary drive force of the electric motor 31 to the ball screw structure 33. The ball screw structure 33 includes a ball 33a that rolls in response to the rotary drive force of the electric motor 31, and a ball screw shaft 33*b* that moves forward and backward in response to the rolling of the ball 33*a*.

The ball screw shaft 33*b* (shaft member) can push the piston 35*a* and can be retracted to a reference position L0 (predetermined position) in the cylinder body 34. The reference position L0 is a position in which the ball screw shaft 33*b* is located when the piston 35*a* abuts against a regulation section 34*s* of the cylinder body 34 and the retraction (movement to the right in the drawing) of the piston 35*a* is restricted. FIG. 1 shows that the ball screw shaft 33*b* has been moved to the left from the reference position L0 by a distance ΔL1. An "electric actuator" that may include the ball screw shaft 33*b* which is retractable to the reference position L0 in the cylinder body 34 may be composed of the electric motor 31, the mechanism 32, the ball 33*a* and the ball screw shaft 33*b*.

The cylinder body 34 is a hollow-shaped member in which the ball screw shaft 33*b*, the piston 35*a*, the spring member 37*a*, the piston 35*b* and the spring member 37*b* are substantially coaxially arranged, in sequence from the right in the drawing. The radially inwardly projecting regulation section 34*s* is formed on the inner wall of the cylinder body 34. The regulation section 34*s* is formed such that the piston 35*a* which is retracted to the right in the drawing abuts against the regulation section 34*s*, thereby restricting the retraction of the piston 35*a*.

The piston 35*a*, 35*b* have a cylindrical shape and are housed in the cylinder body 34 so as to be slidably movable in the axial direction. A radially recessed portion is formed on the peripheral surface of the piston 35*a* such that an annular back chamber Ga is formed between the peripheral surface and the inner peripheral surface of the cylinder body 34. The back chamber Ga communicates with a reservoir 36 via a reservoir port Va. Further, a back chamber Gb is formed between the peripheral surface of the piston 35*b* and the inner peripheral surface of the cylinder body 34 and communicates with the reservoir 36 via a reservoir port Vb.

The pistons 35*a*, 35*b* are disposed to be separated in the axial direction with the spring member 37*a* interposed therebetween. A first pressure chamber Ha that communicates with an output port Wa is formed between the pistons 35*a* and 35*b*. A second pressure chamber Hb that communicates with an output port Wb is formed between the pistons 35*b* and the inner wall surface of the cylinder body 34.

A piston packing K is disposed on the peripheral surface of the pistons 35*a*, 35*b* and separates the back chamber Ga, the first pressure chamber Ha, the back chamber Gb and the second pressure chamber Hb, thereby preventing an oil from being leaked into another chamber. The slave cylinder 30 also includes regulation members 38, 39 for regulating a relative movement of the pistons 35*a*, 35*b* to set a maximum stroke and a minimum stroke.

The reservoir 36 stores a brake fluid and communicates with the reservoir ports Va, Vb. The reservoir 36 communicates with the reservoir 14 of the master cylinder 10 via a piping tube 86, and the internal pressure of the reservoir 36 is substantially equal to the atmospheric pressure. The spring member 37*a* is a compression coil spring interposed between the pistons 35*a*, 35*b* so as to expand and contract depending on the force applied by the pistons 35*a*, 35*b*. The spring member 37*b* is a compression coil spring interposed between the piston 35*b* and the inner wall surface of the cylinder body 34 so as to expand and contract depending on the force applied by the piston 35*b*.

[VSA Device]

The VSA device 40 (an example of automatic brake device) is connected to the master cut valves 50*a*, 50*b* on the upstream side and generates a brake fluid pressure regardless of a brake operation by a driver so as to stabilize a vehicle behavior. Specifically, the VSA device 40 releases wheel lock (antilocked braking system (ABS) control) and distributes optimized braking force to the respective wheels (electronic brake force distribution (EBD) control).

The VSA device 40 includes various brake actuators and is connected to the wheel cylinders 71FR, 71RL, 71RR, 71FL. The wheel cylinder 71FR applies a braking force depending on the brake fluid pressure to a disk brake 70FR and brakes the front right wheel (the other wheel cylinders 71RL, 71RR, 71FL operate in the same manner). The configuration of the VSA device 40 is well known and the detailed description thereof is omitted.

[Connection Relation]

Next, a connection relation of the master cylinder 10, the stroke simulator 20, the slave cylinder 30 and the VSA device 40 will be described. The output port Ta of the master cylinder 10 is connected to the VSA device 40 via the piping tube 81*a*, the master cut valve 50*a* and the piping tubes 82*a*, 84*a*. The connection section between the piping tubes 82*a* and 84*a* is connected to the output port Wa of the slave cylinder 30 via the piping tube 83*a*. This system (including the piping tubes 81*a*-84*a*) corresponds to the wheel cylinder 71FR of the front right wheel and the wheel cylinder 71RL of the rear left wheel.

A pressure sensor Pm that detects a brake fluid pressure upstream to the master cut valve 50*a* is disposed in the piping tube 81*a*. Further, a pressure sensor Pp that detects a brake fluid pressure downstream to the master cut valve 50*b* is disposed in the piping tube 82*b*. The piping tube 81*b* is connected to the input port U of the stroke simulator 20 via the piping tube 85 which is provided with a shutoff valve 50*c*. The other system (including the piping tube 81*b*-84*b*) which corresponds to the wheel cylinder 71RR of the rear right wheel and the wheel cylinder 71FL of the front left wheel is similar to the above described system and the description thereof is omitted.

[Master Cut Valve]

The master cut valve 50*a* may be a normally open type solenoid valve that closes/opens the piping tubes 81*a*, 82*b* in response to a command from the control unit 60. That is, when energized, the master cut valve 50*a* closes to shut off between the master cylinder 10 and the slave cylinder 30. When not energized, the master cut valve 50*a* opens by using a biasing force of a spring member which is incorporated therein to communicate between the master cylinder 10 and the slave cylinder 30.

The master cut valve 50*b* may be a normally open type solenoid valve that closes/opens the piping tubes 81*b*, 82*b* in response to a command from the control unit 60. The master cut valve 50*b* has a configuration similar to that of the master cut valve 50*a* and the description thereof is omitted. FIG. 1 shows that the master cut valves 50*a*, 50*b* are closed (the shaded portions of the brake fluid pressure are substantially the same).

[Control Unit]

Figure 2:
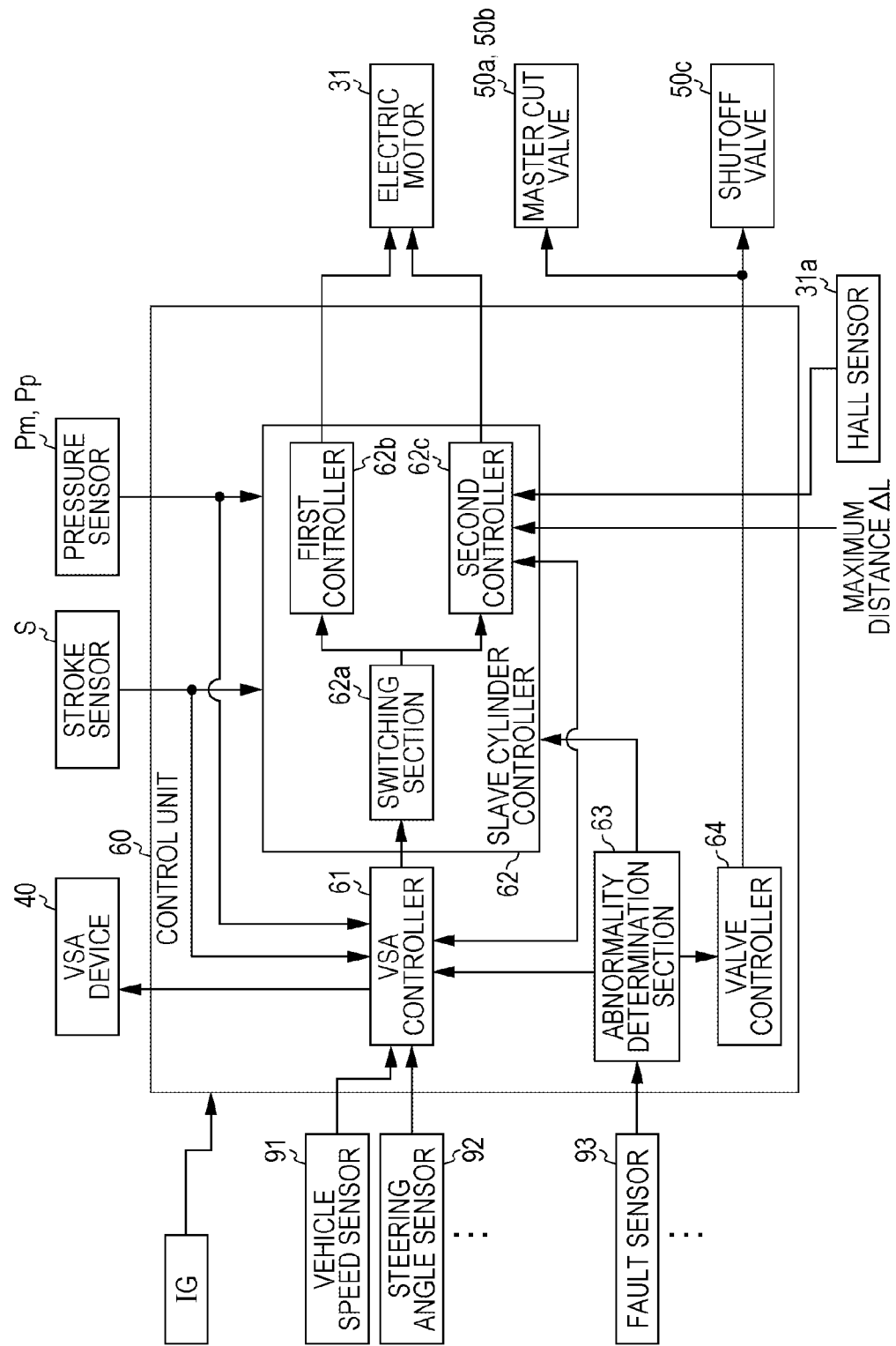
FIG. 2 is a block configuration diagram of a control unit of the vehicle brake system.

The control unit 60 includes an electronic circuit such as a central processing unit (CPU), a read only memory (ROM), a random access memory (RAM) and various interfaces, and performs various functions according to a program stored in the control unit 60. As shown in FIG. 2, the control unit 60 includes a VSA controller 61, a slave cylinder controller 62, an abnormality determination section 63 and a valve controller 64.

The VSA controller 61 stabilizes a behavior of the vehicle by controlling the VSA device 40. That is, the VSA controller 61 performs the above described ABS control, EBD control and the like (hereinafter, collectively referred to as VSA control) in response to a detected signal from the stroke sensor S, the pressure sensors Pm, Pp, Ph, as well as sensors mounted in the vehicle such as a vehicle speed sensor 91 and a steering angle sensor 92. The VSA controller 61 outputs a flag signal: ON to a switching section 62a when controlling the VSA device 40, and outputs a flag signal: OFF to the switching section 62a when not controlling the VSA device 40. The detailed description of the processing by the VSA controller 61 is omitted herein.

The slave cylinder controller 62 actuates the electric motor 31 of the slave cylinder 30 in response to the detected signal from the stroke sensor S, the pressure sensors Pm, Pp and the flag signal from the VSA controller 61. The slave cylinder controller 62 includes the switching section 62a, a first controller 62b and a second controller 62c.

The switching section 62a outputs a switch command to the first controller 62b and the second controller 62c in response to the flag signal from the VSA controller 61. The detailed operation of the switching section 62a will be described later. The first controller 62b performs a normal mode in response to the switch command from the switching section 62a. The "normal mode" is a control mode in which the slave cylinder 30 is actuated in response to stepping of the brake pedal P by the driver in the state that the master cut valves 50a, 50b are closed (FIG. 1 shows the normal mode).

The second controller 62c performs a vehicle behavior stabilization mode in response to the switch command from the switching section 62a. The "vehicle behavior stabilization mode" is a control mode in which the brake fluid pressure is generated by the slave cylinder 30 and the VSA device 40 regardless of stepping of the brake pedal P by the driver in the state that the master cut valves 50a, 50b are closed. For example, when the vehicle enters into a locked state, the control unit 60 controls the slave cylinder 30 and the VSA device 40 in a cooperative manner and applies a predetermined braking force to the respective wheels, thereby stabilizing the behavior of the vehicle.

The abnormality determination section 63 determines whether or not there is abnormality of the vehicle brake system A and outputs a command signal based on the determination result to the VSA controller 61, the slave cylinder controller 62 and the valve controller 64. For example, when a valve element does not move even though the master cut valves 50a, 50b are energized, the abnormality determination section 63 determines an "abnormality" based on the detected signal from the fault sensor 93 of the valve element.

A "system fail mode" is a mode in which the brake fluid pressure is directly generated by stepping of the brake pedal P by the driver in the state that the master cut valves 50a, 50b are opened during occurrence of abnormality of the vehicle brake system A.

When the valve controller 64 receives a signal which corresponds to "no abnormality" from the abnormality determination section 63, the valve controller 64 outputs an energization command to a power supply circuit (not shown in the figure) to close the master cut valves 50a, 50b. This state corresponds to the normal mode (see FIG. 1) and the vehicle behavior stabilization mode (see FIG. 4). When the valve controller 64 receives a signal which corresponds to "abnormality" from the abnormality determination section 63, the valve controller 64 outputs a shutoff command to the power supply circuit (not shown in the figure) to terminate energization and open the master cut valves 50a, 50b. This state corresponds to the system fail mode (see FIG. 5). Further, the valve controller 64 opens the shutoff valve 50c in the normal mode.

[Operation of Vehicle Brake System]

Figure 3:
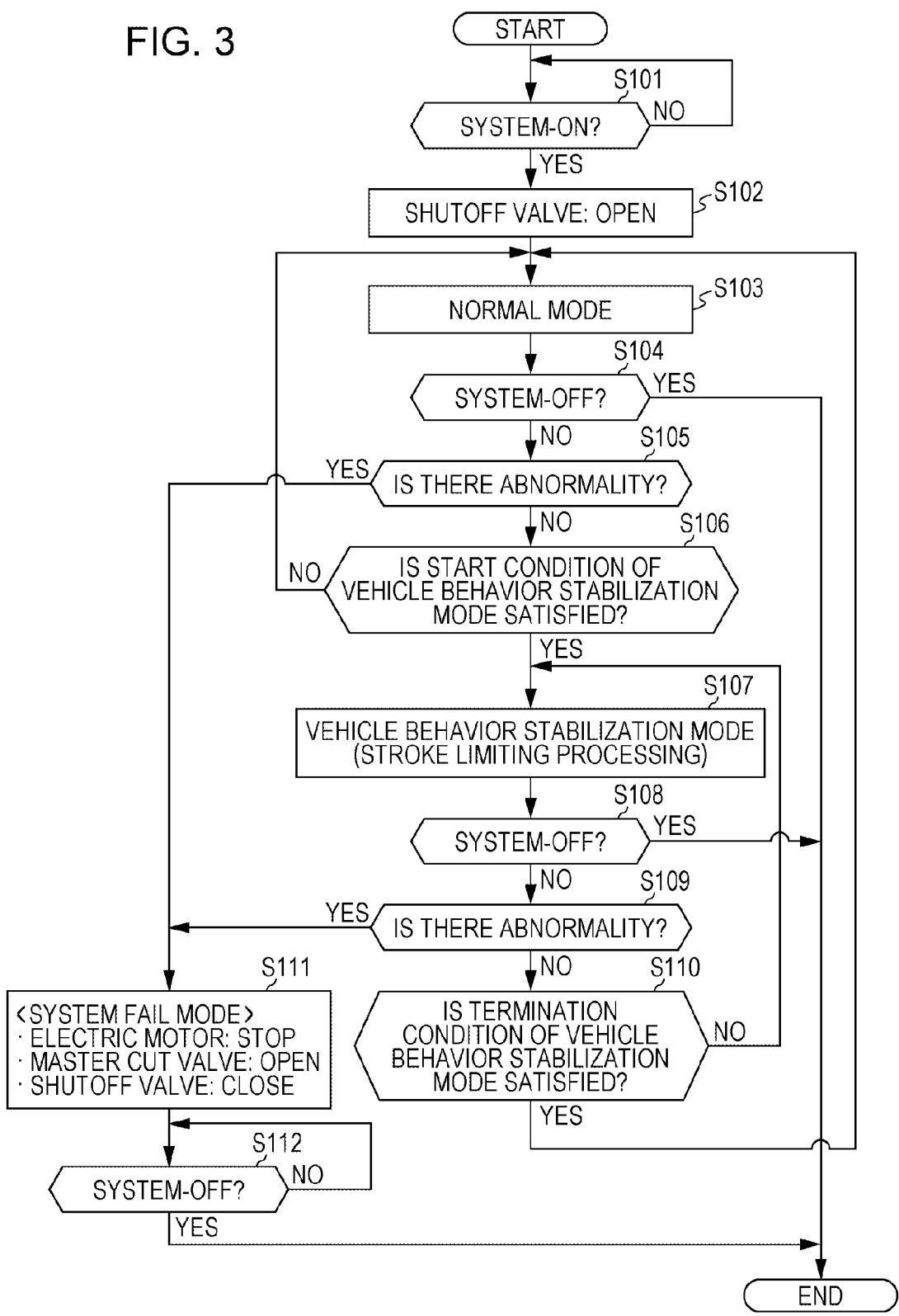
FIG. 3 is a flow diagram of a processing performed by the control unit.

FIG. 3 is a flow diagram of a processing performed by the control unit. In step S101, the control unit 60 determines whether a system-ON signal is input or not. The system-ON signal is input to the control unit 60, for example, when a vehicle door is detected to be opened by a door switch (not shown in the figure) or when an ignition switch IG is turned ON. When the system-ON signal is input (S101→Yes), the processing of the control unit 60 proceeds to step S102. When the system-ON signal is not input (S101→No), the control unit 60 repeats the step S101.

In step S102, the control unit 60 opens the shutoff valve 50c by the valve controller 64 (see FIG. 2). Moreover, when the stroke sensor S detects the brake pedal P being stepped, the control unit 60 closes the master cut valves 50a, 50b by the valve controller 64. Accordingly, an operational reaction force corresponding to the stepping force of the brake pedal P can be generated.

In step S103, the normal mode is performed. That is, the switching section 62a of the control unit 60 (see FIG. 2) actuates the first controller 62b in response to the flag signal: OFF from the VSA controller 61. The first controller 62b actuates the electric motor 31 depending on the stepping amount of the brake pedal P (see FIG. 1) which is input from the stroke sensor S and generates a predetermined brake fluid pressure. In the normal mode, the shutoff valve 50c is opened and the VSA device 40 is stopped.

As shown in FIG. 1, when the driver steps the brake pedal P, the pistons 13a, 13b are advanced and the relief ports Ra, Rb are shut off. The stroke simulator 20 generates the operational reaction force corresponding to the stepping force of the brake pedal P. Further, when the pistons 35a, 35b are advanced by driving the electric motor 31, the brake fluid pressure of the first pressure chamber Ha acts on the wheel cylinders 71FR, 71RL and the brake fluid pressure of the second pressure chamber Hb acts on the wheel cylinders 71RR, 71FL. Accordingly, in the normal mode, the control unit 60 allows the brake fluid pressure corresponding to the stepping force of the driver to be generated by the electric motor 31 while closing the master cut valves 50a, 50b to shut off the upstream side and the downstream side of the master cut valves 50a, 50b.

In step S104 of FIG. 3, the control unit 60 determines whether a system-OFF signal is input or not. When the system-OFF signal is input (S104→Yes), the processing of the control unit 60 is terminated (END). When the system-OFF signal is not input (S104→No), the processing of the control unit 60 proceeds to step S105.

In step S105, the control unit 60 determines by the abnormality determination section 63 whether an abnormality occurs in the electric motor 31, the master cut valves 50a, 50b or the like. When there is an abnormality (S105→Yes), the processing of the control unit 60 proceeds to step S111. When there is no abnormality (S105→No), the processing of the control unit 60 proceeds to step S106.

In step S106, the control unit 60 determines whether a start condition of the vehicle behavior stabilization mode is satisfied or not based on the detected signal from the vehicle speed sensor 91 (see FIG. 2), the steering angle sensor 92 and the like. The criterion of the determination is determined in advance depending on the type of vehicle behavior stabilization mode such as the ABS control and the EBD control. When the start condition of the vehicle behavior stabilization mode is satisfied (S106→Yes), the processing of the control unit 60 proceeds to step S107. When the start condition of the vehicle behavior stabilization mode is not satisfied (S106→No), the control unit 60 continues the normal mode (S103).

In step S107, the control unit 60 performs the vehicle behavior stabilization mode (see FIG. 4) by the VSA controller 61 (see FIG. 2) without reflecting the stepping amount of the brake pedal P to the braking force or the respective wheels. Further, the switching section 62a of the control unit 60 actuates the second controller 62c in response to the flag signal: ON from the VSA controller 61 and performs a stroke limiting processing (see FIG. 2, FIG. 4). The stroke limiting processing controls the electric motor 31 (outputs a duty command value) so that the ball screw shaft 33b is not allowed to move by a distance larger than the maximum distance ΔL from the reference position L0 in a state that the retraction of the ball screw shaft 33b is regulated.

The maximum distance ΔL is a distance capable of supplementing a lack of the brake fluid pressure generated by the VSA device 40 and generating a sufficient braking force (that is, the driver does not feel a free running feeling) during an initial stepping of the brake pedal P in a system fail mode (S111), which will be described later. That is, the maximum displacement distance ΔL corresponds to a maximum amount of fluid loss which may be generated when the displacement of the ball screw shaft 33b stops (an ineffective stroke which may occur during the initial stepping of the brake pedal P).

Figure 4:
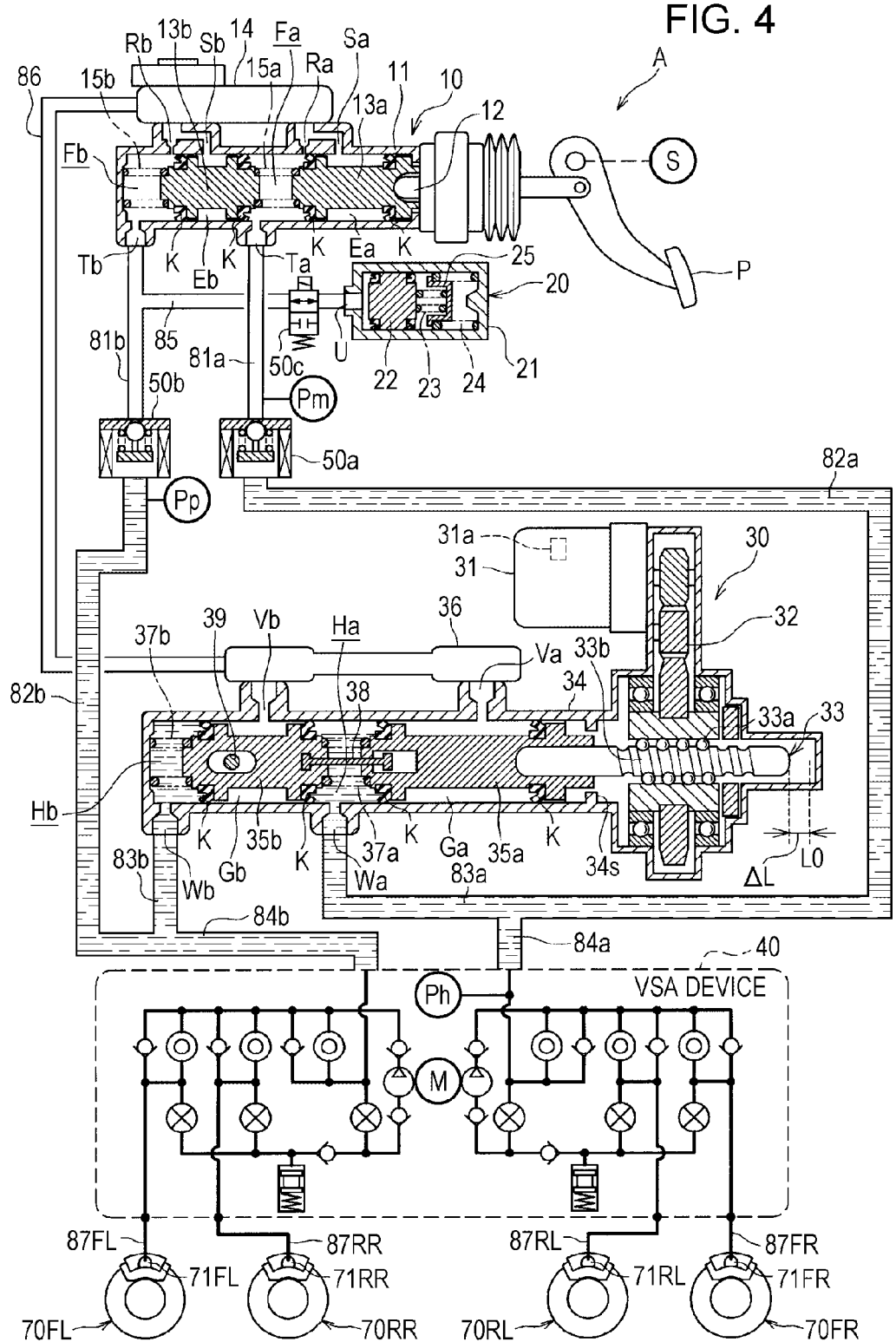
FIG. 4 is a hydraulic circuit diagram of the vehicle brake system in a vehicle behavior stabilization mode.

The second controller 62c (see FIG. 2) calculates a displacement amount of the ball screw shaft 33b based on the signal from the hall sensor 31a (displacement detection unit) while the master cut valves 50a, 50b are shut off and the VSA device 40 is operated. Then, as shown in FIG. 4, the second controller 62c controls the electric motor 31 so that the ball screw shaft 33b is not allowed to move by a distance larger than the maximum distance ΔL from the reference position L0. During the processing of step S107, the control unit 60 allows the master cut valves 50a, 50b to remain closed and the shutoff valve 50c remains open.

In step S108 of FIG. 3, the control unit 60 determines whether the system-OFF signal is input or not. When the system-OFF signal is input (S108→Yes), the processing of the control unit 60 is terminated (END). When the system-OFF signal is not input (S108→No), the processing of the control unit 60 proceeds to step S109.

Then, in step S109, the control unit 60 determines by the abnormality determination section 63 (see FIG. 2) whether an abnormality occurs in the electric motor 31, the master cut valves 50a, 50b or the like. When there is an abnormality (S109→Yes), the processing of the control unit 60 proceeds to step S111. When there is no abnormality (S109→No), the processing of the control unit 60 proceeds to step S110.

In step S110, the control unit 60 determines whether a termination condition of the vehicle behavior stabilization mode is satisfied or not based on the detected signal from the vehicle speed sensor 91 (see FIG. 2), the steering angle sensor 92 and the like. When the termination condition of the vehicle behavior stabilization mode is satisfied (S110→Yes), the control unit 60 repeats the normal mode (S103). When the termination condition of the vehicle behavior stabilization mode is not satisfied (S110→No), the processing of the control unit 60 returns to step S107.

Figure 5:
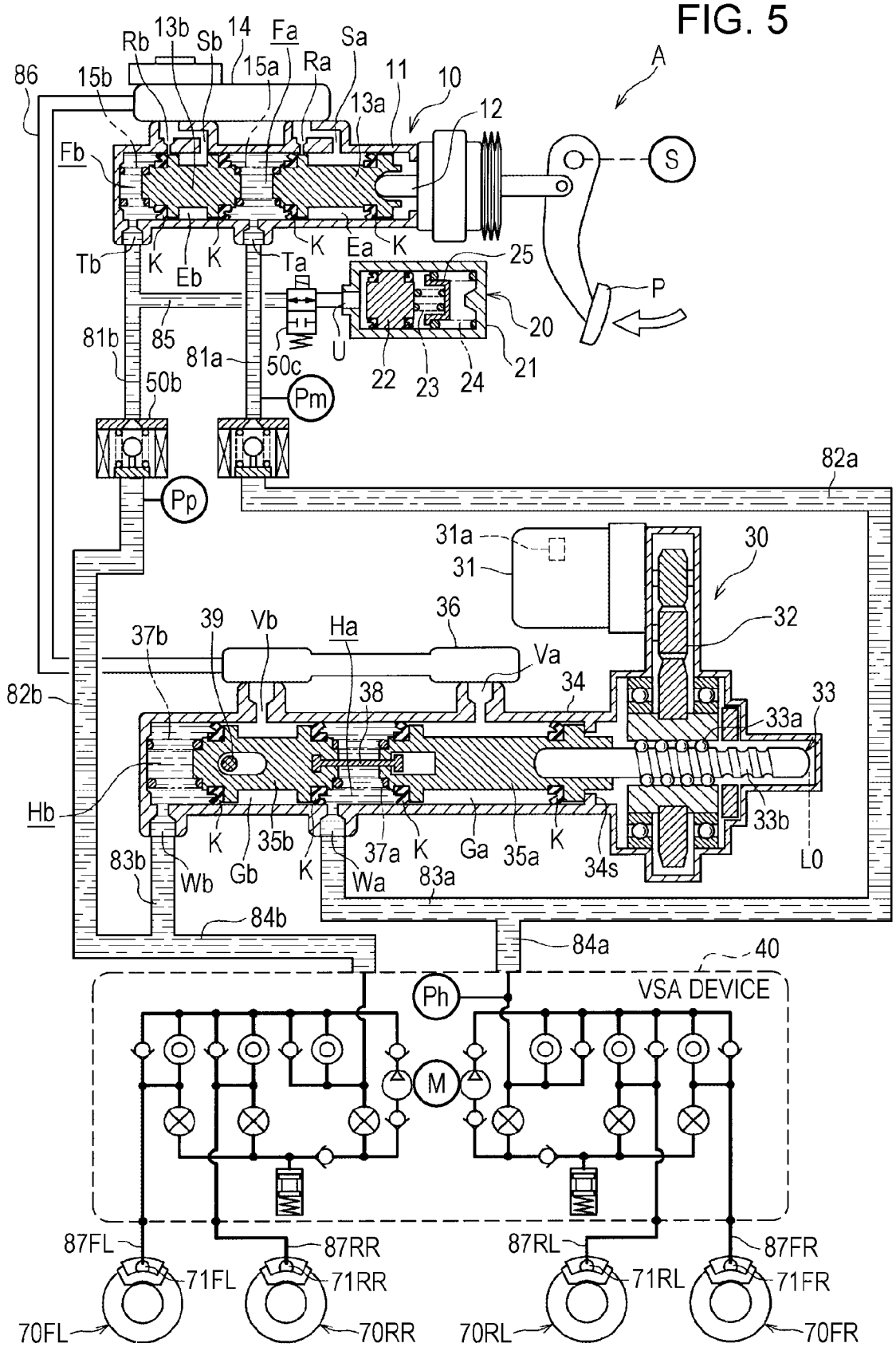
FIG. 5 is a hydraulic circuit diagram of the vehicle brake system in a system fail mode.

In step S111, the control unit 60 performs the system fail mode. The control unit 60 stops energization of the electric motor 31 and opens (stops energization of) the master cut valves 50a, 50b, as shown in FIG. 5. Further, the control unit 60 closes the shutoff valve 50c and directly reflects stepping of the brake pedal P by the driver to the braking force of the vehicle.

The following describes the state of the vehicle brake system "A" immediately after the master cut valves 50a, 50b are opened. As shown in FIG. 5, when the master cut valves 50a, 50b are opened, the first pressure chamber Ha of the slave cylinder 30 communicates with the reservoir 14 via the piping tubes 83a, 82a, 81a and the first pressure chamber Fa of the master cylinder 10.

Consequently, the brake fluid flows into the master cylinder 10 having a relatively lower pressure. This causes the pressure of the first pressure chamber Ha of the slave cylinder 30 to be decreased (the same applies to the second pressure chamber Hb). As a result, the displacement of the ball screw shaft (retraction to the right in the drawing) stops at a position where it is balanced with the friction force of the gear mechanism 32 and the ball screw structure 33.

During the vehicle behavior stabilization mode of step S106, the displacement of the ball screw shaft 33b is not allowed to exceed the maximum distance ΔL. That is, immediately after transition to the system fail mode, the ball screw shaft 33b is located in the proximity of the reference position L0 where it can be retracted. Accordingly, in the initial stepping of the brake pedal P after transition to the system fail mode (S112), a fluid loss which is necessary to retract the ball screw shaft 33b to the reference position L0 can be reduced. As a result, the driver can smoothly perform a brake operation in the initial stepping without feeling a free running.

In step S112 of FIG. 3, the control unit 60 determines whether the system-OFF signal is input or not. When the system-OFF signal is input (S112→Yes), the processing of the control unit 60 is terminated (END). When the system-OFF signal is not input (S112→No), the control unit 60 repeats the processing of the step S112.

[Effect]

According to the vehicle brake system A of this embodiment, in the vehicle behavior stabilization mode in which the brake operation of the driver (the stepping force of the brake pedal P) is not reflected to the actual braking force, the control unit 60 limit the displacement of the ball screw shaft 33b not to exceed the maximum distance ΔL (see S107 in FIG. 3).

The amount of the maximum distance ΔL is determined in advance to be in a range in which a predetermined braking force can be generated in response to a brake operation by the driver in a state that the control unit 60 opens the master cut valves 50a, 50b and stops the electric motor 31 in occurrence of abnormality. Accordingly, at the time of transition to the system fail mode (see S111 in FIG. 3), the displacement of the ball screw shaft 33b from the reference position L0 can be limited not to exceed the maximum distance ΔL.

In the vehicle behavior stabilization mode, a lack of the brake fluid pressure by the VSA device 40 is assisted by the slave cylinder 30. Accordingly, in the vehicle behavior stabilization mode, the first pressure chamber Ha and the second pressure chamber Hb tend to have a pressure lower than that in the normal mode in which the brake fluid pressure is generated solely by the slave cylinder 30.

In this embodiment, as described above, in the vehicle behavior stabilization mode, the control unit 60 limits the displacement of the ball screw shaft 33b not to exceed the maximum distance ΔL. Accordingly, after transition to the system fail mode, a sufficient braking force can be generated during the initial stepping of the brake pedal P. Further, the fluid loss in retraction of the ball screw shaft 33b can be appropriately reduced by setting the maximum distance ΔL based on the property in a low temperature in which the brake fluid has a high viscosity.

After transition to the system fail mode, the ball screw shaft 33b is fully returned to the reference position L0 by the initial stepping of the brake pedal P. Therefore, the driver can continue the brake operation thereafter.

Modified Example

Although the vehicle brake system A of the present disclosure has been described in connection with the above embodiment, the disclosure is not limited thereto and various modification are possible. For example, although the above embodiment has been described that the operation of the slave cylinder controller 62 is switched by the switch command from the switching section 62a of the control unit 60 to the first controller 62b, second controller 62c, the disclosure is not limited thereto. For example, the maximum distance of the displacement of the ball screw shaft 33b may or may not be provided based on whether the vehicle behavior stabilization mode is performed by the VSA controller 61.

Further, although the above embodiment has been described that the displacement of the ball screw shaft 33b is indirectly detected by the hall sensor 31a, the disclosure is not limited thereto. That is, the displacement of the ball screw shaft 33b is directly detected by using a positional sensor or the like. Further, although the above embodiment has been described that the rotary drive force of the electric motor 31 is converted into the movement in the axial direction by the ball screw structure 33, the conversion can be performed by using a screw member other than the ball screw structure 33.

Further, although the above embodiment has been described that the brake operation by the driver is performed by using the brake pedal P, the disclosure is not limited thereto. For example, the brake operation by the driver may be performed via a brake lever. Further, although the above embodiment has been described that the "automatic brake device" that generates a brake fluid pressure regardless of the brake operation by the driver is the VSA device 40, the disclosure is not limited thereto. That is, the "automatic brake device" may be an active cruise control, a collision mitigation brake or a device that performs climbing cooperation control with a power plant. Specifically, the above described embodiment is preferably applied to a case where a collision mitigation brake is provided that generates the highest brake fluid pressure in the automatic brake devices.

We claim:

1. A vehicle brake system comprising:
   a master cylinder to which a brake operation by a driver is input;
   a slave cylinder including a cylinder body, a piston and a shaft member disposed in the cylinder body, the shaft member extending and retracting in the cylinder body with being retractable up to a top dead point, the slave cylinder configured to drive an electric actuator having the shaft member to generate a brake fluid pressure by moving the piston by the shaft member;
   a master cut valve that opens and closes a communication between the slave cylinder and the master cylinder;
   a controller that controls the electric actuator and the master cut valve; and
   an automatic brake device which has an upstream side connected to the master cut valve and is configured to generate the brake fluid pressure regardless of the brake operation by the driver,
   wherein, during operation of the automatic brake device, the controller closes the master cut valve and controls the electric actuator to limit an extending displacement of the shaft member from the top dead point by the electric actuator such that the shaft member does not reach a bottom dead point located opposite to the top dead point.

2. The vehicle brake system according to claim 1, wherein a maximum distance of the extending displacement limited by the controller is determined to be in a range in which a predetermined braking force can be generated in response to the brake operation by the driver in a state that the controller stops the electric actuator and opens the master cut valve in occurrence of abnormality.

3. The vehicle brake system according to claim 2, further comprising a displacement detector that directly or indirectly detects the displacement of the shaft member, wherein the controller closes the master cut valve, calculates the extending displacement of the shaft member based on a signal from the displacement detector and controls the electric actuator to limit the extending displacement not to exceed the maximum distance.

4. The vehicle brake system according to claim 1, wherein the controller limits the displacement of the shaft member from the top dead point so as to reduce a fluid loss necessary to retract the shaft member to the top dead point after the master cut valve is opened.

5. A vehicle brake system controlling method, the vehicle brake system comprising:
   a master cylinder to which a brake operation by a driver is input;
   a slave cylinder including a cylinder body, a piston and a shaft member disposed in the cylinder body, the shaft member extending and retracting in the cylinder body with being retractable up to a top dead point, the slave cylinder configured to drive an electric actuator having the shaft member to generate a brake fluid pressure by moving the piston by the shaft member;
   a master cut valve that opens and closes a communication between the slave cylinder and the master cylinder;
   a controller that controls the electric actuator and the master cut valve; and
   an automatic brake device which has an upstream side connected to the master cut valve and is configured to generate the brake fluid pressure regardless of the brake operation by the driver,
   the method comprising:
   detecting operation of the automatic brake device; and
   during the operation of the automatic brake device, closing the master cut valve and controlling the electric actuator to limit an extending displacement of the shaft member from the top dead point by the electric actuator such that the shaft member does not reach a bottom dead point located opposite to the top dead point.

* * * * *